(12) United States Patent
Green et al.

(10) Patent No.: US 6,808,835 B2
(45) Date of Patent: Oct. 26, 2004

(54) SYSTEM FOR THE HUMIDIFICATION OF POLYMER ELECTROLYTE MEMBRANE FUEL CELLS

(75) Inventors: Kevin J Green, Gosport (GB); Michael J Freeman, Gosport (GB); William R Slee, Gosport (GB)

(73) Assignee: Qinetiq Limited (GB)

(*) Notice: Subject to any disclaimer, the term of this patent is extended or adjusted under 35 U.S.C. 154(b) by 0 days.

(21) Appl. No.: 10/416,449

(22) PCT Filed: Oct. 30, 2001

(86) PCT No.: PCT/GB01/04804
§ 371 (c)(1),
(2), (4) Date: May 12, 2003

(87) PCT Pub. No.: WO02/41431
PCT Pub. Date: May 23, 2002

(65) Prior Publication Data
US 2004/0028974 A1 Feb. 12, 2004

(30) Foreign Application Priority Data
Nov. 14, 2000 (GB) .............................. 0027728

(51) Int. Cl.[7] .................................. H01M 8/10
(52) U.S. Cl. ............................ 429/30; 429/26; 429/31; 429/34; 429/25; 429/13
(58) Field of Search .............................. 429/30, 26, 31, 429/34, 25, 13

(56) References Cited

U.S. PATENT DOCUMENTS 4,826,741 A * 5/1989 Aldhart et al. ................. 429/19
5,432,023 A * 7/1995 Yamada et al. ................ 429/34

FOREIGN PATENT DOCUMENTS

| EP | 0569062 A | 11/1993 |
| EP | 0872907 A | 10/1995 |
| EP | 0929112 A | 7/1999 |
| WO | 99/60642 A | 11/1999 |

* cited by examiner

Primary Examiner—Patrick Ryan
Assistant Examiner—Angela J. Martin
(74) Attorney, Agent, or Firm—Nixon & Vanderhye P.C.

(57) ABSTRACT

A system for the humidification of polymer electrolyte membrane fuel cells, the system comprising a first layer and a second layer; wherein the first layer comprises a porous material (11) substantially coincident with a first surface of a polymer electrolyte membrane fuel cell (10); wherein the second layer comprises a non-absorbent material (12) substantially coincident with the first layer; and wherein perforations in the second layer allow air to flow through the first and second layers to a cathode (17) of the polymer electrolyte fuel cell.

14 Claims, 10 Drawing Sheets

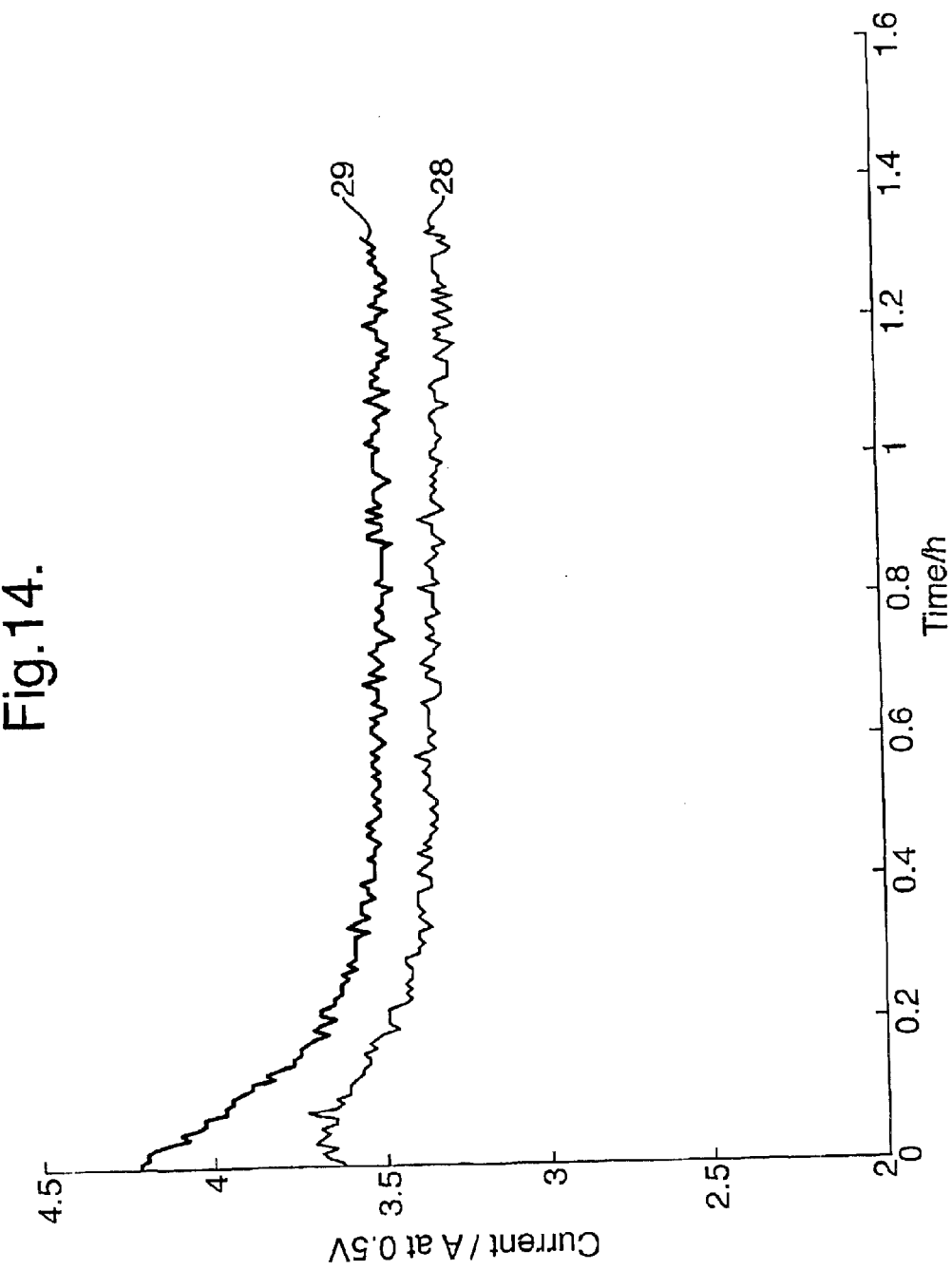

SYSTEM FOR THE HUMIDIFICATION OF POLYMER ELECTROLYTE MEMBRANE FUEL CELLS

This application is the US national phase of international application PCT/GB01/04804 filed Oct. 30, 2001, which designated the US.

This invention relates to a system for the humidification of a polymer electrolyte membrane fuel cell (PEMFC), a fuel cell containing such a system, and a method of modifying a fuel cell to include such a system.

A PEMFC has an air or oxygen facing surface and a fuel facing surface. The electrolyte used comprises a thin (10–200 $\mu$m) proton conducting polymer membrane, often based on perfluorocarbonsulphonic acid. A catalyst layer is applied to either side of the membrane, followed on the air or oxygen facing side by a gas diffusion layer, and on the fuel facing side by a gas diffusion layer. The gas diffusion layer is commonly a carbon cloth or paper. Often the gas diffusion layer is treated to ensure that the surface in contact with the catalyst layer is hydrophobic, ensuring that water is removed from the immediate vicinity of the catalyst layer. Examples of gas diffusion layer include 'Toray™ carbon paper' made by Etek (USA), or 'Carbel™' manufactured by W L Gore (USA). Finally an electrically conductive material is added to the air or oxygen side to form a cathode and an electrically conductive layer is added to the fuel side as an anode. In use, a fuel, most commonly hydrogen gas, is supplied to the anode and oxygen, either pure or more usually from the surrounding air, is supplied to the cathode. The cell reaction can be represented as follows:

at the anode: $H_2 \rightarrow 2H^+ + 2e^-$, at the cathode: $\frac{1}{2}O_2 + 2H^+ + 2e^- \rightarrow H_2O$.

The by-product of the cell reaction is water. The efficiency of a PEMFC is strongly dependent on the conductivity of the polymer membrane, which is in turn dependent on the amount of water retained within the membrane.

Polymer electrolyte membrane fuel cells have a polarisation curve that gives rise to maximum power at approximately 0.5V per cell. It is advantageous to run a fuel cell system at maximum power, however resistive losses cause the temperature of the fuel cell to increase. This increase in temperature drives water from the polymer electrolyte membrane causing it to dry out. As the membrane dries out its resistance increases. This leads to a further increase in temperature, which in turn drives more water from the membrane. Efficient water management is therefore essential to enable a fuel cell to be operated continuously at maximum power.

The problem of dehydration of polymer electrolyte membranes has been addressed in several ways. EP 0980106 describes a system whereby water is supplied as a liquid to the cathode and thence to the electrolyte membrane. This provides the necessary humidification, but requires a separate water supply and pumping system. This adds complexity, weight and bulk to a polymer electrolyte fuel cell power plant.

An alternative method is to pass the fuel gas, usually hydrogen, through water before supplying it to the fuel cell. Again, this requires external equipment and a supply of water.

A still further method is described in U.S. Pat. No. 5,503,944. This uses a closed water circulation loop that provides the necessary water to the electrolyte and additionally functions as a cooling system. This also requires additional equipment and, in common with the other approaches described above, circumvents the problem of dehydration of the electrolyte membrane by providing an additional water supply.

In accordance with the present invention, there is provided a polymer electrolyte membrane fuel cell provided with a humidification system comprising at least a first layer and a second layer, wherein the first layer comprises an air permeable, absorbent layer disposed adjacent or in close proximity to a first surface of a polymer electrolyte membrane fuel cell, and wherein the second layer comprises a non-absorbent material disposed adjacent or in close proximity to the first layer, the second layer having through openings therein to allow passage of air through the second and first layers to the fuel cell interior.

The present invention retains water near to the first surface of the PEMFC and therefore the membrane of the PEMFC, whilst still allowing sufficient air to reach the cathode. This maintains the humidity of the membrane, and hence its conductivity. Maximum power can thus be drawn from the fuel cell for extended periods. Unlike the prior art approaches described above, the present invention addresses the problem of dehydration of the polymer electrolyte membrane by efficiently managing the water produced during operation of the fuel cell, not by providing an additional water supply. Water storage and associated pumping and supply means are therefore not required, leading to savings in size and weight and improved robustness.

The first layer will usually be in direct contact with the fuel cell outer surface and will not be electrically conductive, although in some arrangements an intermediate layer may be present.

Preferably, the first surface of the polymer electrolyte fuel cell comprises an air or oxygen facing surface. This may be a cathode or a cathode current collector.

It may be that the cathode or cathode current collector is provided with a protective surface layer or coating. This may be for example, a layer of plastic that is used to prevent damage to the cathode. In this case, the first layer may be substantially co-incident with this protective coating.

The non-absorbent material may be in the form of a substantially solid structure forming an impervious barrier or shell, except for the through openings that are provided to permit inflow of air. The through openings may comprise preformed passageways or holes or may be subsequently provided as perforations. In any case, they extend from one surface of the second layer to its opposite surface to allow air to pass through the second layer. The openings (eg passageways or perforations) in the second layer are most conveniently circular as this shape is simple to produce, for example by drilling. Clearly, any other shaped passageways or perforations, such as slots or squares may equally be used. Furthermore, the passageways or perforations in any individual second layer need not all be of a similar size.

The preferred size and number of through openings in the second layer is such that a balance is reached between an adequate supply of air (oxygen) to the cathode and efficient retention of water in the vicinity of the polymer electrolyte membrane. The open surface area in the second layer would usually not exceed 10% and for most applications will not be more than 5%.

Preferably, the non-absorbent material comprises a rigid material.

Preferably, the non-absorbent material comprises stainless steel, nickel, titanium or other metal.

Alternatively, the non-absorbent material may comprise a non-metallic material such as PTFE or related polymer, a plastic material, or a composite material such as Kevlar™.

The first and second layers will usually be in contact with one another and the fuel cell outer surface, and may be held or fastened tightly in contact with each other. Preferably, the non-absorbent material of the second layer is in the form of a sheet with a surface having raised features. These features may comprise a series of interconnected voids or channels forming ridges or corrugations, or may constitute a series of peaks and troughs such as those found on an 'egg box'. This creates voids between the first and second layer where air may circulate. On such a ridged second layer the ridges should preferably not exceed 5 mm in height, and may be curved or angular in shape.

Preferably, the through openings in the second layer are not in direct contact with the first layer.

The second layer may be in the form of a cover for the fuel cell, optionally with attachment means, which may be secured tightly on or around the fuel cell.

The air permeable, absorbent first layer stores water in a region in close proximity to the membrane. The layer will normally comprise a porous material, which may comprise a fibrous woven or non-woven material. The first layer ideally comprises a hydrophilic material. Usually, it will be formed of a sheet or plurality of sheets, at least one of which is of a water absorbent nature, and may comprise a cloth, with cotton, other natural fibres or absorbent synthetic fibres being particularly suitable. Other examples could include paper or other sheets that have water wicking and, retaining properties.

The porosity of a porous material will affect the performance of the fuel cell. A highly porous material helps air to permeate to the cathode of the fuel cell, but also increases the rate of dehumidification. Conversely, a low porosity material is advantageous with respect to preventing the membrane from drying out, but has a tendency to starve the cathode of air (oxygen).

Advantageously, the surface (or a surface layer region) of the first layer adjacent to the fuel cell is hydrophobic. For example, the layer may be treated so that it is water repellent on the side adjacent to the fuel cell. This assists in retaining water within the gas flow path, ensuring humidification. Several methods can be used to make the surface or surface layer region water repellent, such as plasma coating or spraying with-a perfluorinated polymer, which may include polytetrafluoroethylene (PTFE), other polyfluoroalkyls or polyfluorosilanes, or other polymers such as polyvinyidene-fluoride (PVDF), halo amino and other substituted triazine polymers. Particularly suitable are the superhydrophobic fluoroethane coatings manufactured by the Cytonix Corporation, Fluorothane™ and FluoroSyl™, also Tullanox™ manufactured by Tulco Inc, and plasma coatings ParaLast™ and Parylene™.

Alternatively, a separate hydrophobic, air permeable layer could be interposed between the fuel cell and the first layer to provide the water repellent function at the fuel cell surface, so that treatment of the first layer is not required.

Preferably, the system further comprises an air permeable, absorbent layer substantially coincident with a second surface of a polymer electrolyte membrane fuel cell.

Preferably, the second surface of the polymer electrolyte membrane fuel cell comprises a fuel facing surface. This may be a fuel flow plate, a former, an anode or an anode current collector. Moisture which is retained in the first layer is carried back to the fuel cell in the fuel stream. This provides additional humidification to the membrane of the fuel cell, further improving performance.

In a further aspect, the present invention provides a humidification system for a polymer electrolyte membrane fuel cell comprising an air permeable, absorbent first layer, a second layer of a non-absorbent material, which layer has through openings therein, and attachment means for securing the first and second layers in that respective order to a first surface of a polymer electrolyte membrane fuel cell. The humidification system may comprise a kit for modifying a planar fuel cell or a tubular fuel cell.

In summary, the impervious second layer of the humidification system minimises water losses by convection and transpiration, enabling the absorbent, preferably hydrophilic, fraction of the first layer to retain water therein, while the hydrophobic surface layer or surface region, if provided in contact with the fuel cell body, ensures that gas access to the fuel cell is maintained.

The present invention further provides a system for the humidification of polymer electrolyte membrane fuel cells comprising a first layer and a second layer; wherein the first layer comprises a porous material substantially coincident with a first surface of a polymer electrolyte membrane fuel cell; wherein the second layer comprises a non-absorbent material substantially coincident with the first layer; and wherein perforations in the second layer allow air to flow through the first and second layers to a cathode of the polymer electrolyte fuel cell.

The invention will now be particularly described by way of example only with reference to the accompanying drawings in which.

Figure 1:
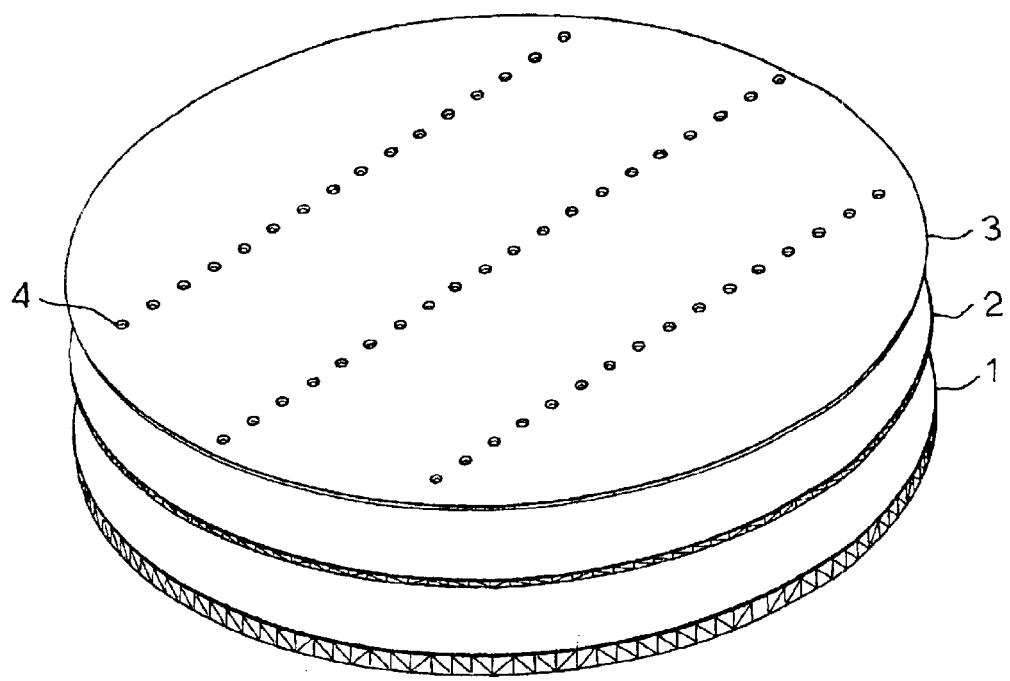
FIG. 1 shows an exploded view of a planar fuel cell fitted with a humidification system according to the present invention.
Figure 2:
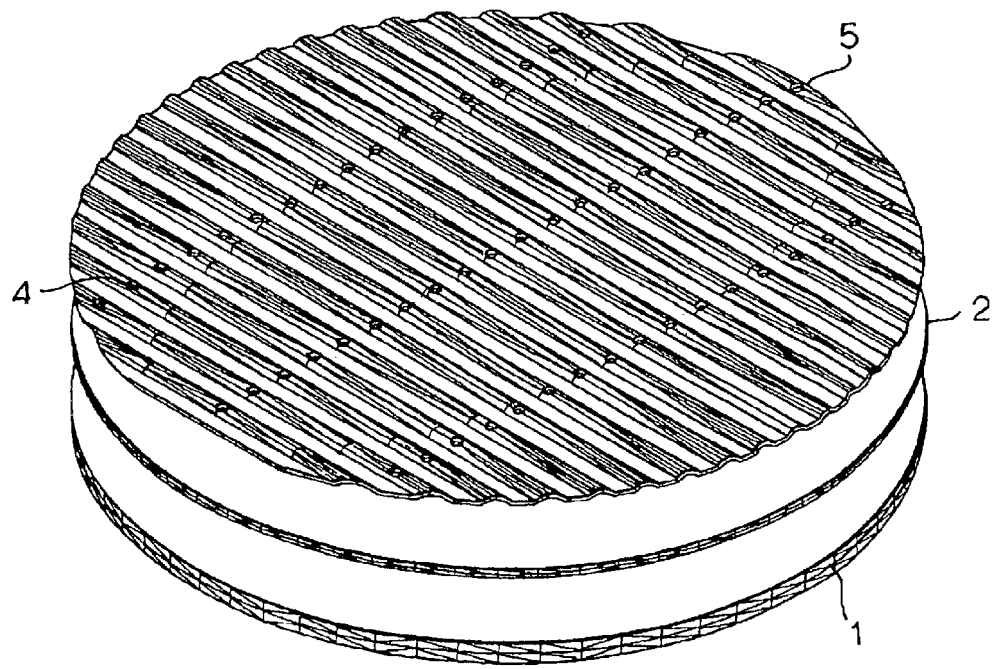
FIG. 2 shows a further exploded view of a planar fuel cell fitted with an alternative humidification system according to the present invention.
Figure 3:
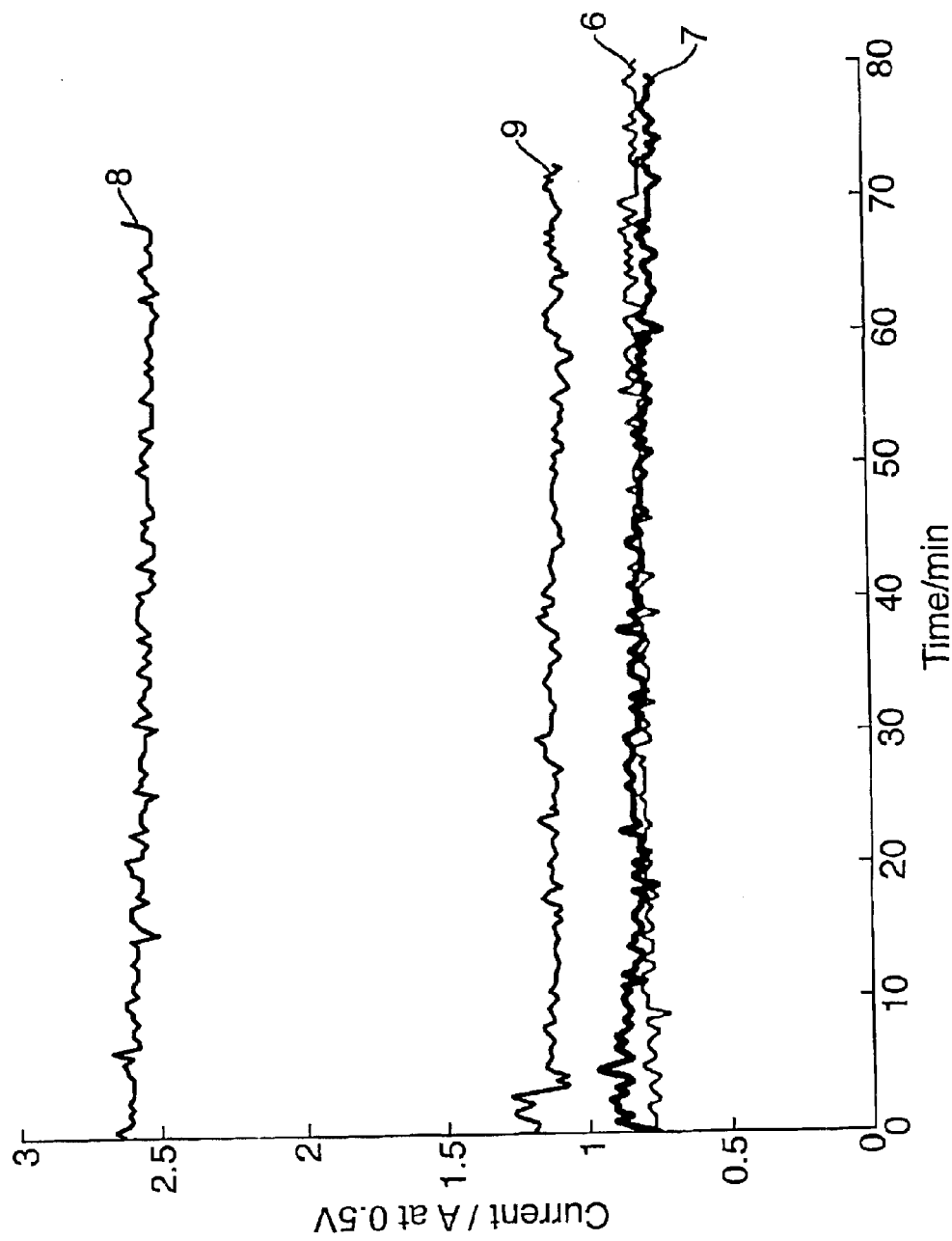
Figure 4:
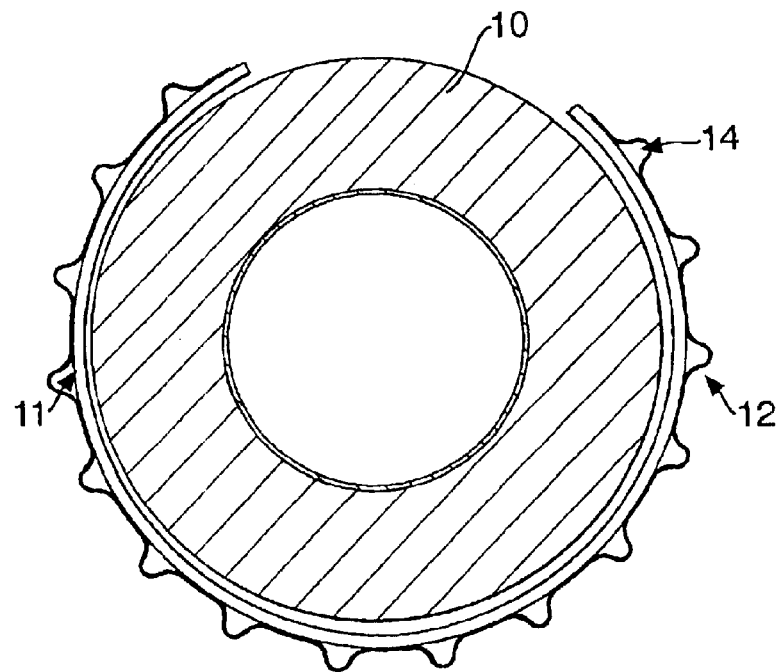
Figure 5:
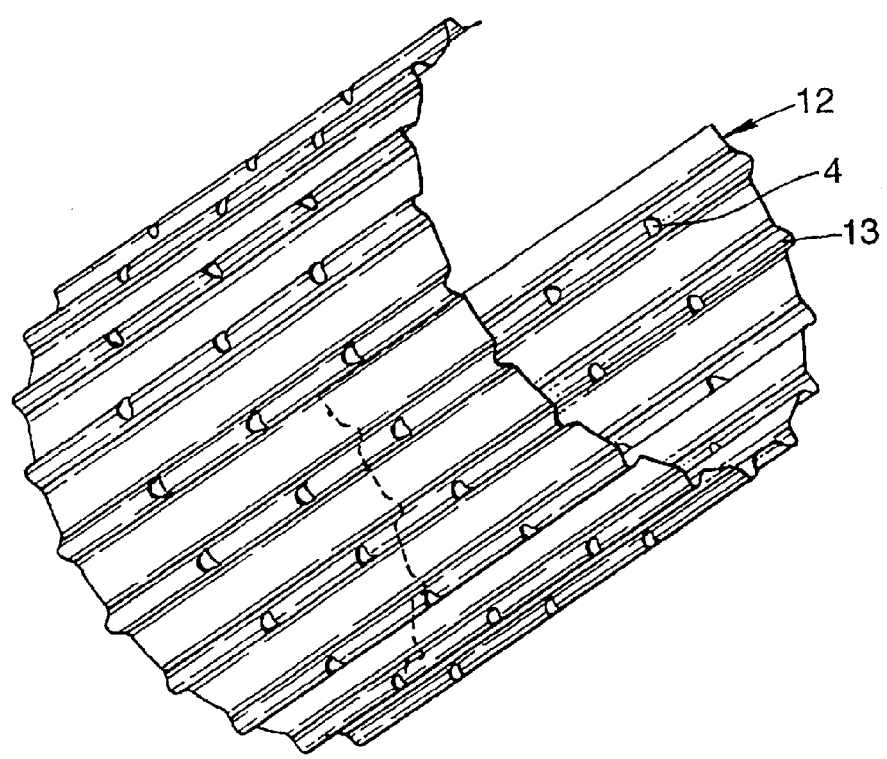
Figure 6:
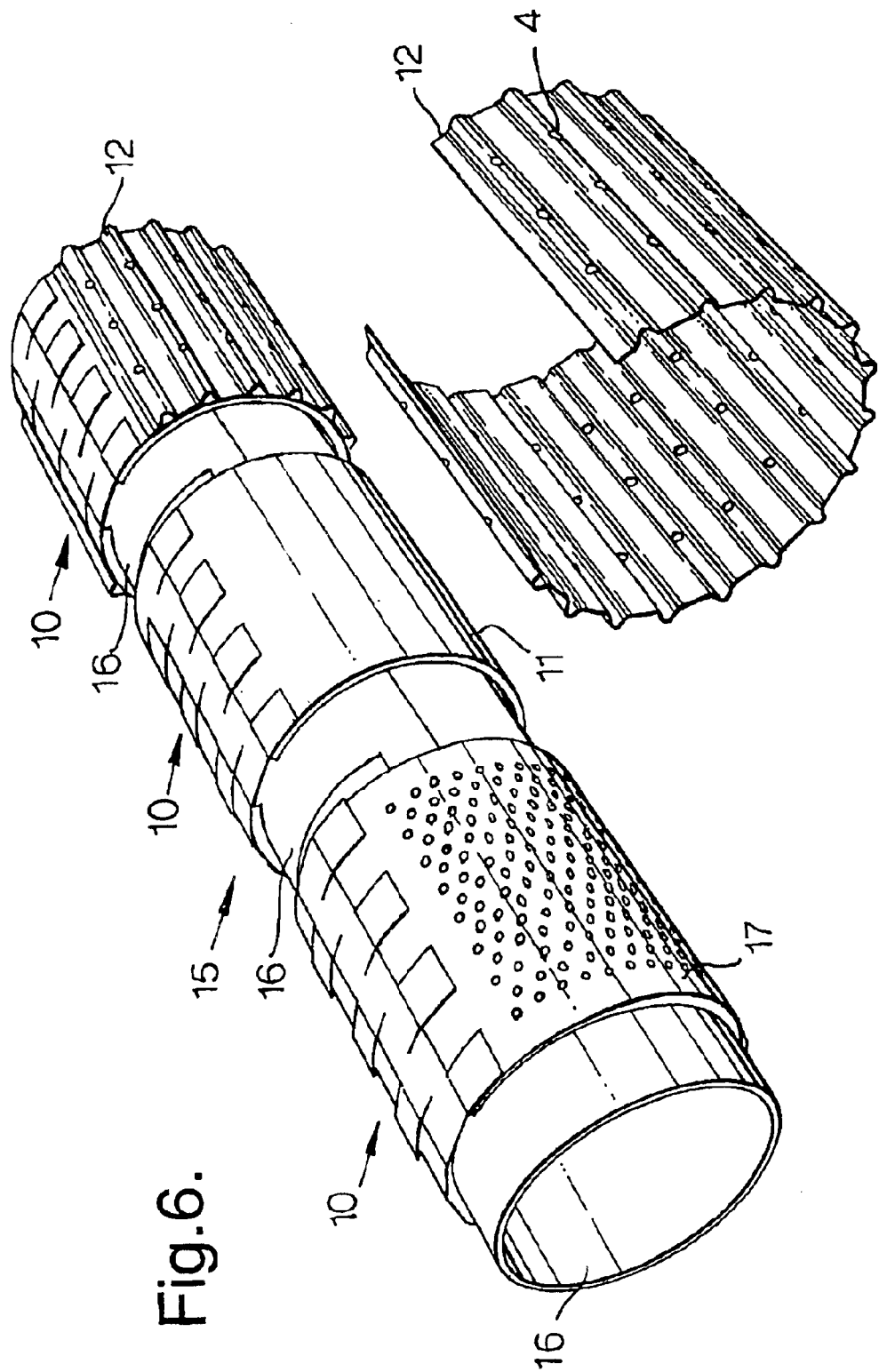
Figure 7:
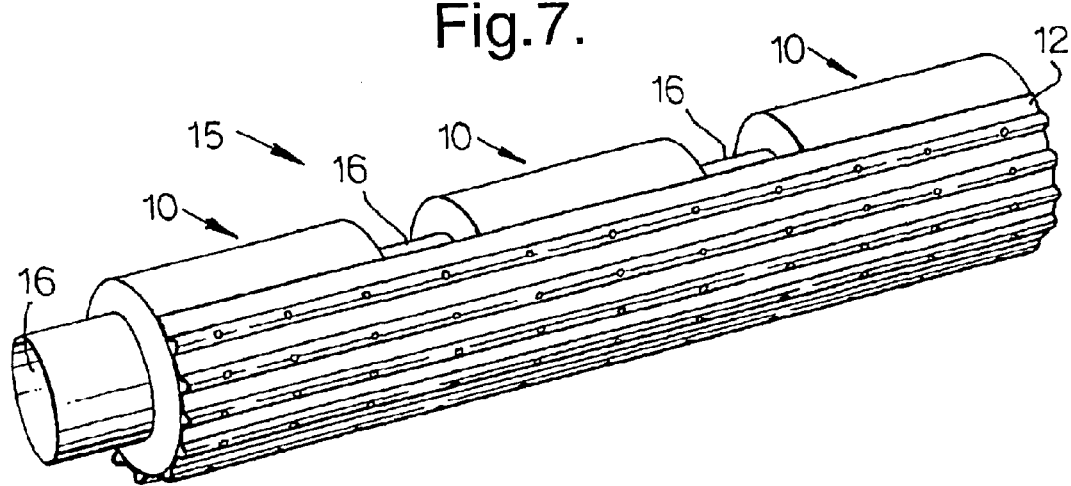
Figure 8:
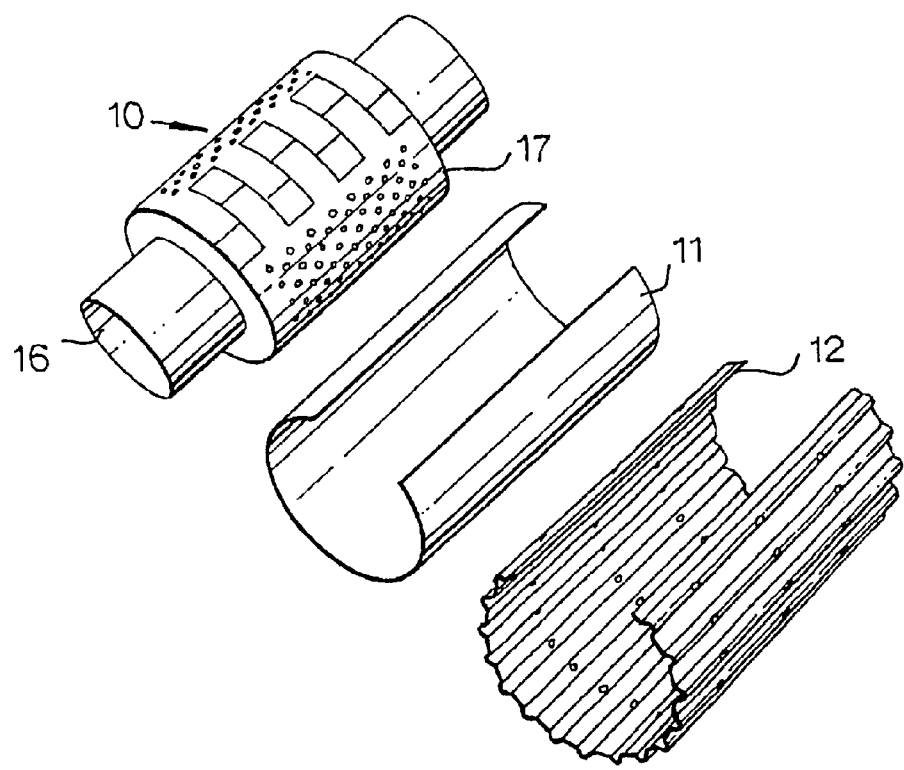
Figure 9:
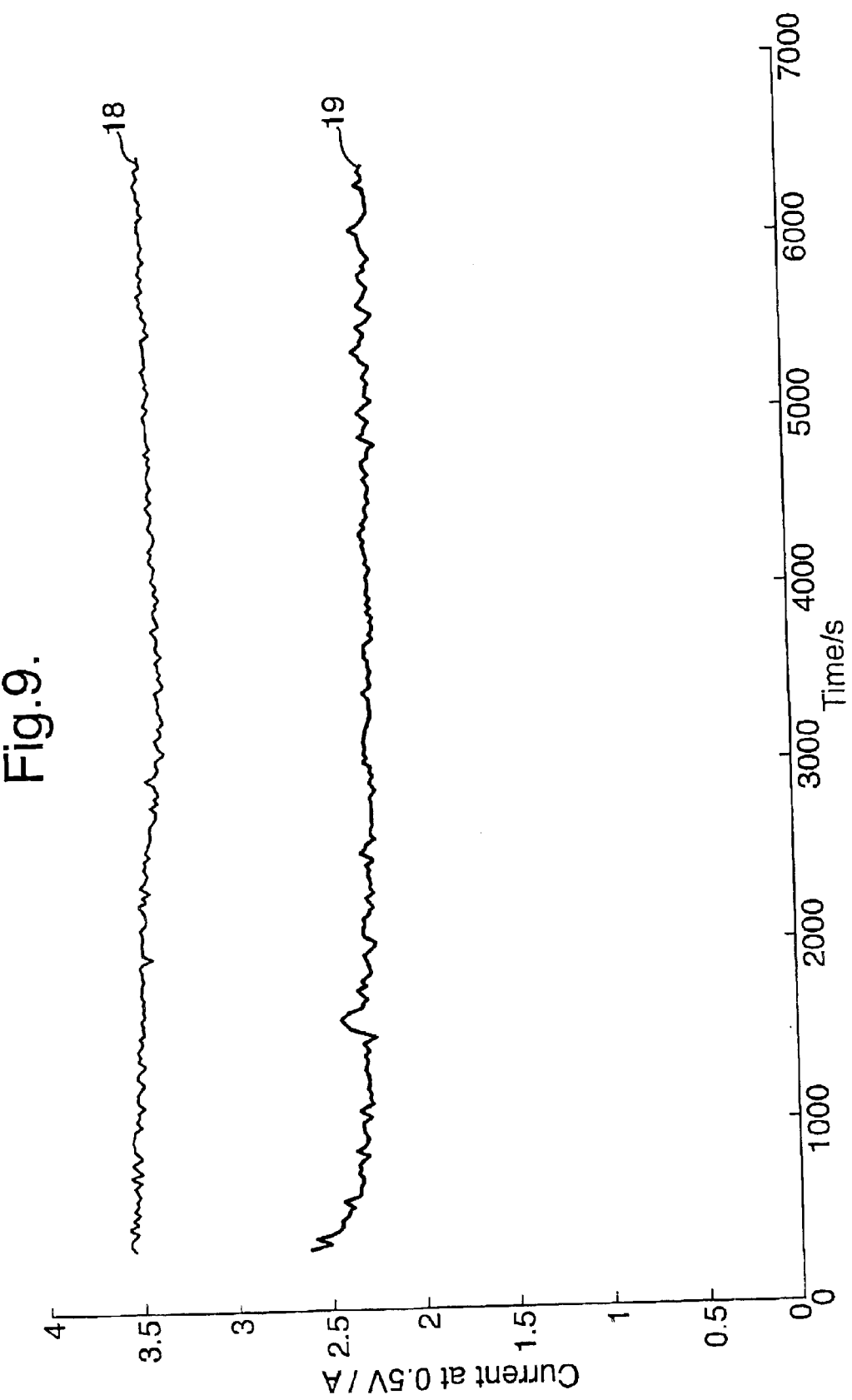
Figure 10:
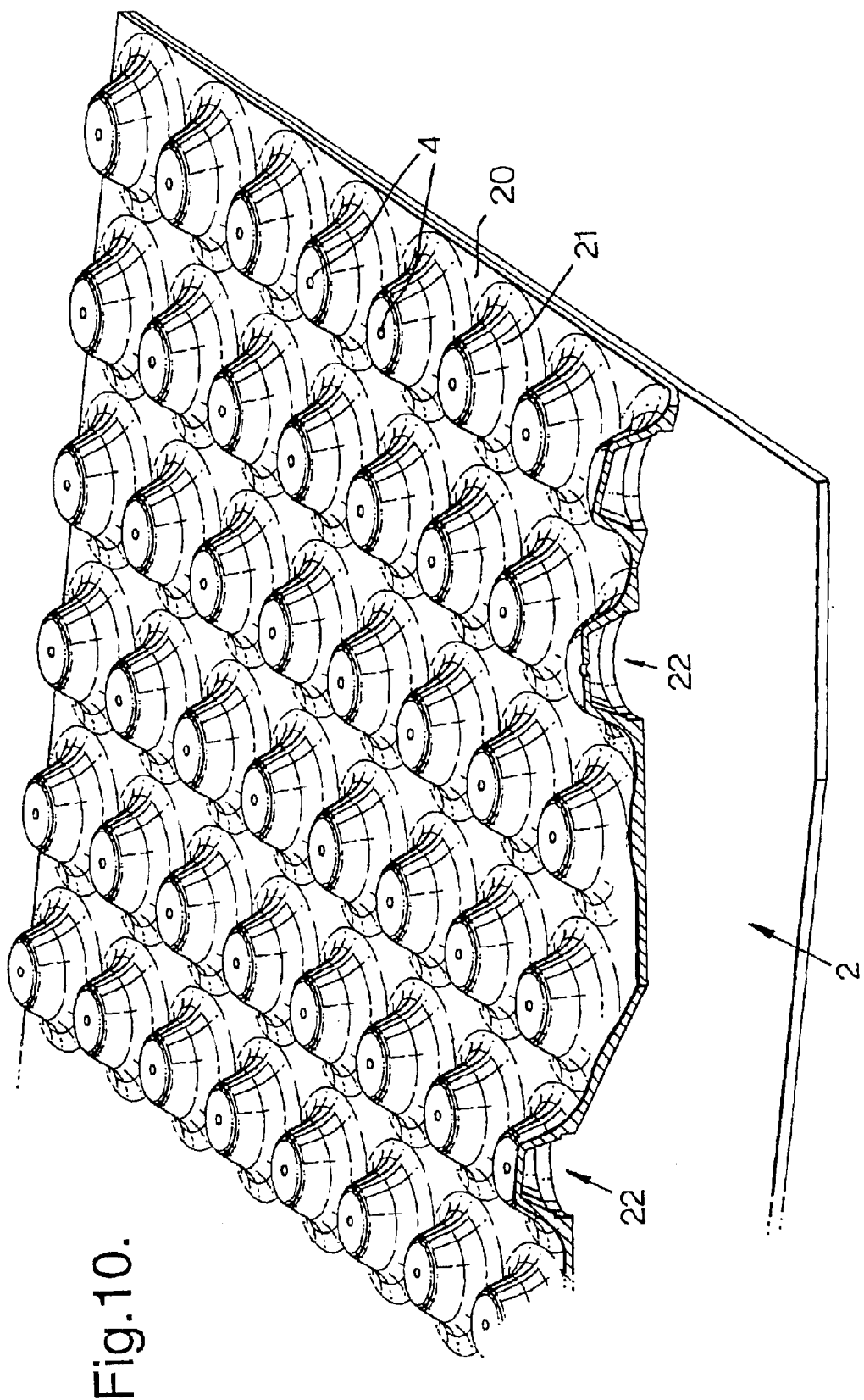
Figure 11:
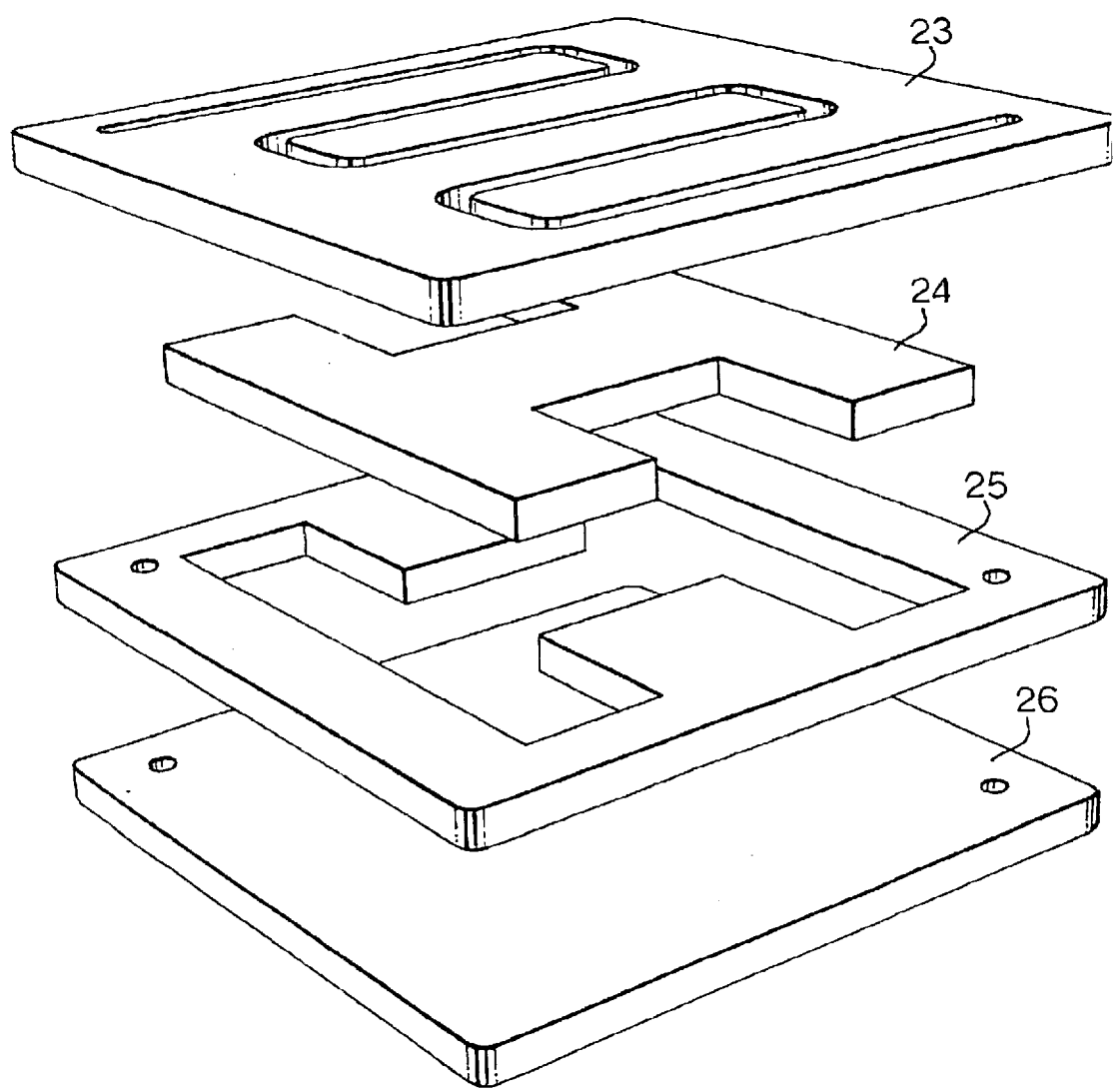
Figure 12:
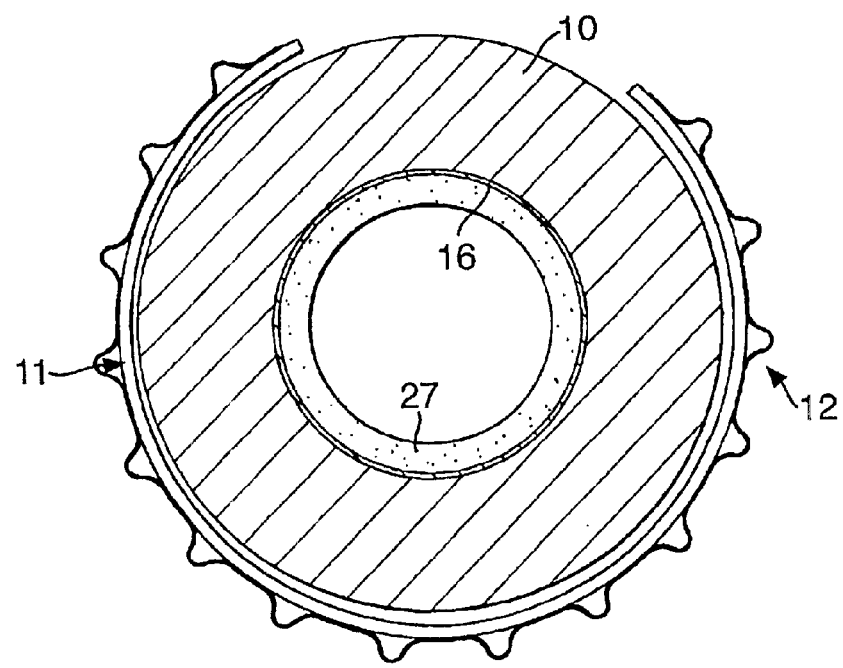
Figure 13:
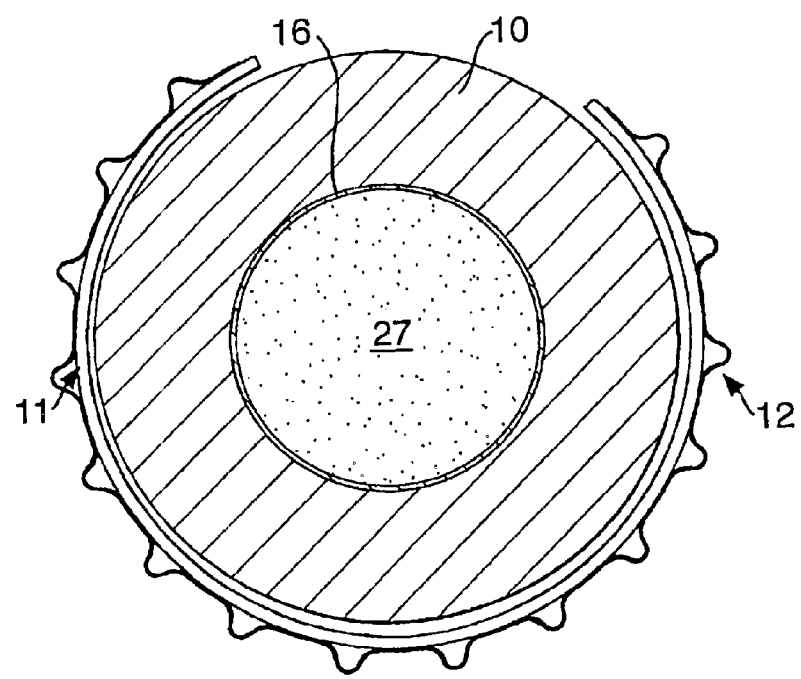

FIG. 3 plots current at maximum voltage for the fuel cells of FIGS. 1 and 2, with and without a humidification system according to the present invention;

FIG. 4 shows a cross section of a further example of a system for the humidification of a tubular polymer electrolyte membrane fuel cell according to the present invention;

FIG. 5 shows an example of a perforated and corrugated stainless steel sheet suitable for use as a second layer of a humidification system for a tubular fuel cell according to the present invention;

FIG. 6 shows an exploded view of a fuel cell humidification system incorporating the sheet of FIG. 5 in place around a tubular fuel cell system;

FIG. 7 shows a humidification system incorporating a perforated layer which extends over three fuel cell elements;

FIG. 8 shows exploded view of a humidification system with overlapping first and second layers;

FIG. 9 plots current at maximum voltage against time for the fuel cell system of FIG. 6 with and without a fuel cell humidification system according to the present invention;

FIG. 10 shows an example of an alternative perforated layer having raised features suitable for use in the present invention;

FIG. 11 shows an exploded view of an alternative humidification system for a planar fuel cell;

FIGS. 12 and 13 show examples of the tubular fuel cell of FIG. 4 incorporating a second porous layer coincident with the fuel facing surface of the fuel cell; and, FIG. 14 plots current at maximum voltage against time for the fuel cell system of FIG. 12.

An air facing surface of a planar fuel cell 1 is covered by a porous cloth 2, the material from which it is made having been sprayed with PTFE in order to make the material water repellent. This cloth is then covered by a flat, perforated stainless steel sheet 3 as shown in FIG. 1, or by a corrugated, perforated sheet 5, as shown in FIG. 2. In this example, the sheets 3, 5 have a thickness of 0.12 mm and there are three rows of perforations 4. The arrangement of the perforations into rows as shown in FIGS. 1 and 2 is merely illustrative. Many alternative arrangements can be devised. For the corrugated sheet 5, the perforations are sited on the ridges of the corrugations so that they are as far as possible from the cloth layer. In this example, the diameter and density of the perforations are such that ca. 1.5% of the surface of the second layer is perforated. The degree of perforation is dependent on the type of fuel cell and the application, however typically, between 1 and 10% of the surface of the second layer is perforated, although a higher or lower degree of perforation may be used.

The results of extended tests are shown in FIG. 3. Curves 6, 7, 8, and 9 show, respectively the current at a voltage of 0.5V for an uncovered planar cell 1, a planar cell covered only with a cloth 2, a covered planar cell as shown in FIG. 1 (cloth and flat plate) and a covered planar cell as shown in FIG. 2 (cloth and corrugated plate). The uncovered cell produced an average current of around 0.8 A, this can be compared to an average of 1.25 A for a cell fitted with the humidification system as shown in FIG. 2 and a current of more than 2.5 A for the system shown in FIG. 1. The improvements in performance are clear and, in the case of the system of FIG. 1, represents a three-fold increase in power compared to an uncovered cell.

An example of a humidification system for a tubular fuel cell is shown in FIGS. 4 to 6. An air facing surface of a tubular fuel cell 10 is wrapped by a cloth 11 the material of which has been sprayed with polyvinyldenefluorinde (PVDF) on the inner surface to make the material water repellent. This cloth 11 is then wrapped and held in place by a perforated and corrugated stainless steel sheet 12. The sheet 12 which, in this example has a thickness of 0.12 mm, is shown in more detail in FIG. 5. There are forty-eight, 0.75 mm$^2$ perforations 4, evenly spaced and sited on the peaks of sixteen corrugations 13. This means that, in this example, the perforations comprise ca. 4.5% of the surface area of the second layer. As described above, with reference to the planar fuel cell, the degree of perforation of the surface of the second layer is dependent on the type of fuel cell and the application, and it may be higher or lower than this value as required. As shown in FIG. 4 this arrangement creates channels 14 between the first and second layers which allow air to flow. In this example, the perforations are substantially evenly spaced over the surface of the corrugated layer, however it will be clear that this is merely one of many arrangements which can be envisaged and is shown only to illustrate the present invention.

A three cell, tubular fuel cell system 15 is shown in FIG. 6. Each cell 10 is constructed around a perforated former 16 and incorporates an anode and a catalyst coated polymer electrolyte membrane (neither shown) as well as a perforated cathode current collector 17. The details of this tubular fuel cell system are the subject of the present applicant's co-pending patent application WO 99/60642. The absorbent cloth 11 is wrapped around the cathode current collector 17 followed by the perforated and corrugated sheet 12. In FIG. 6, each corrugated sheet 12 is shown sized to fit around the cathode current collector 17. This makes efficient use of materials by making sure that only the working parts of the fuel cell are covered, however it may be simpler, as shown in FIG. 7, to provide a single corrugated sheet which extends to cover all three of the cells in the system 15. Similarly, a single absorbent cloth 11 covering all of the cells in the system may be used. Furthermore, there may be some overlap whereby one layer is larger or smaller than another. This is shown in FIG. 8 where the perforated sheet 12 is larger than the absorbent cloth 11, which itself is larger than the cathode current collector 17.

In use, there is a temperature difference between the inner surface of the cloth adjacent to the cathode 17 and the outer surface of the cloth 11 adjacent to the corrugated, stainless steel sheet 12. This allows water to condense on the inner surface of the stainless steel sheet and be retained within the cloth. Air passing through the perforations 4 in the steel sheet and the cloth to the cathode is humidified by this retained water. The retained water can also pass through the perforations in the cathode current collector 17 to maintain the humidity of the polymer electrolyte membrane.

FIG. 9 shows the results of a long duration test for the fuel cell of FIG. 6. The average current output at maximum voltage (0.5V) was ca. 3.5A using the humidification system (curve 18 in FIG. 9) but only ca. 2.5 A without (curve 19 in FIG. 9). This represents an improvement in power of some 40%.

An alternative perforated sheet is shown in FIG. 10. This sheet 20 has raised features 21 which form an 'egg box' type surface. Perforations 4 are sited on the raised features such that they are as far from the cloth layer 2 as possible. This creates voids 22 through which air can circulate. This and the corrugated sheet described above are merely two examples of suitable surfaces and it will be readily apparent that many others may be conceived of without departing form the scope of the present invention.

Additional performance improvements can be gained by providing a porous layer coincident with a fuel facing surface of the fuel cell. An example suitable for a planar fuel cell is shown in FIG. 11. A hydrogen flow plate 23 is used to direct fuel to the anode of a fuel cell (not shown). A porous layer 24 is arranged to be substantially coincident with the flow plate 23. In order to prevent leakage of hydrogen, the porous layer is contained within a holder 25 and backed with a backing plate 26. In this example the porous layer 24 is shown as 'H' shaped, but this has no special significance. Water that is expelled from the fuel cell during use is retained on the porous layer and re-introduced to the fuel cell in the hydrogen fuel stream.

A similar arrangement can be used for a tubular fuel cell, as shown in FIGS. 12 and 13. The fuel cell 10 is formed around a perforated former 16 which directs hydrogen to the anode of the fuel cell in much the same fashion as the hydrogen flow plate shown in FIG. 11. A porous layer 27, which is substantially coincident with the former is used to retain the moisture which is expelled from the fuel cell during use. As before, this moisture is reintroduced to the fuel cell in the hydrogen gas stream, which in the case of a tubular fuel cell is provided via the central void of the fuel cell. The porous layer may be relatively thin as shown in FIG. 12, or it may fill the central void, as shown in FIG. 13, or it may be of any intermediate thickness.

The improvement in performance is shown in FIG. 14. Curve 28 represents a fuel cell with a humidification system coincident with the air facing surface as shown in FIG. 4. Curve 29 represents one as shown in FIG. 12, with an additional porous layer coincident with the fuel facing surface of the fuel cell. The improvement is not as marked as that seen between a bare fuel cell and one covered with a porous layer and a corrugated layer i.e. that which is shown for the fuel cells represented by curves 19 and 18 of FIG. 9, nonetheless it is a significant (ca. 4%) additional improvement.

EXAMPLE

A demonstration of the effectiveness of a 2 layer cover forming a humidification system for a single tubular fuel cell of the type shown in FIG. 6 can be observed by monitoring the humidity in the hydrogen fuel within the fuel cell.

With no other methods of humidification, the only source of water vapour is from the back diffusion of water through the polymer electrolyte membrane from the site of water production at the cathode catalyst layer. To some extent, the rate of back diffusion depends upon the degree of saturation within the membrane; the greater the degree of saturation the greater the rate of back diffusion.

Monitoring the humidity in the fuel cell was achieved by placing a humidity sensor (Honeywell HIH 3605A) in the central void of the tubular fuel cell. This device was used to monitor the humidity in the gaseous hydrogen fuel; without any humidification the background relative humidity was found to be 15%. The cover, consisting of a layer of absorbent cloth and a corrugated metal, placed over the surface of the tubular fuel cell, could be removed from the surface of the tubular fuel cell. This enabled comparisons of the humidity within the fuel cell with and without the cover to be obtained. The rate of hydrogen flow through the fuel cell was 0.667 ml min$^{-1}$.

An environmental cabinet (Vötsch Industrietechnik VC 4018), was used to control the ambient temperature and humidity of the fuel cell. The fuel cell was electrically loaded until it gave an average current of 50 mA cm$^{-2}$, and the cell voltage, output from the humidity sensor and surface temperature were all monitored, and once stable, logged.

The results for monitored cell voltages through the series of experiments are shown in Table 1. The results show that the operating fuel cell voltages are higher for the fuel cells with covers, which further supports the data shown in FIG. 9.

TABLE 1

Results of humidity experiments, 50 mA cm$^{-2}$

| Ambient temperature ° C. | Ambient humidity | Measured Voltage V | |
|---|---|---|---|
| | | Without covers | With covers |
| 10 | 65 | 0.64 | 0.69 |
| 10 | 85 | 0.64 | 0.69 |
| 25 | 45 | 0.63 | 0.70 |
| 25 | 65 | 0.65 | 0.70 |
| 25 | 85 | 0.65 | 0.70 |
| 40 | 45 | 0.58 | 0.68 |
| 40 | 65 | 0.62 | 0.68 |
| 40 | 85 | 0.65 | 0.70 |

The results are measured internal humidity are shown in Table 2

TABLE 2

Results of humidity experiments, 50 mA cm$^{-2}$

| Ambient temperature ° C. | Ambient humidity | Internal relative humidity % | |
|---|---|---|---|
| | | Without covers | With covers |
| 10 | 65 | 51 | 65 |
| 10 | 85 | 53 | 68 |
| 25 | 45 | 38 | 57 |
| 25 | 65 | 43 | 58 |
| 25 | 85 | 48 | 60 |
| 40 | 45 | 35 | 44 |
| 40 | 65 | 38 | 50 |
| 40 | 85 | 46 | 58 |

These results show that the humidity within the fuel cell is higher when the cover is used, which implies that more water is present within the membrane, assisting the conduction of protons. This is the desired result and shows that the cover is an effective method of retaining water.

Although described with reference to planar and tubular fuel cells, it will be clear that the concept of the present invention can be applied to other differently shaped fuel cell systems. Furthermore, although the foregoing description and examples are concerned with the application of a humidification system to fuel cells which use hydrogen as a fuel, this is not intended to be limiting. The system of the present invention may also find application for other types of fuel cells, for example those which use methanol or other hydrocarbons as a fuel.

What is claimed is:

1. A polymer electrolyte membrane fuel cell provided with a humidification system comprising at least a first layer and a second layer, wherein the first layer comprises an air permeable, absorbent layer disposed adjacent or in close proximity to a first surface of a polymer electrolyte membrane fuel cell, and wherein the second layer comprises a non-absorbent material disposed adjacent or in close proximity to the first layer, the second layer having through openings therein to allow passage of air through the second and first layers to the fuel cell interior.

2. A fuel cell according to claim 1, wherein the first surface of the polymer electrolyte membrane fuel cell comprises an air or oxygen facing surface.

3. A fuel cell according to claim 1, wherein the first surface of the polymer electrolyte membrane fuel cell comprises a cathode or a cathode current collector.

4. A fuel cell according to claim 1, wherein the non-absorbent material comprises a rigid material.

5. A fuel cell according to claim 1, wherein the non-absorbent material comprises a sheet of stainless steel, nickel, titanium or other metal.

6. A fuel cell according to claim 1, wherein the non-absorbent material comprises a non-metallic material such as PTFE or related polymer, a plastic material, or a composite material such as Kevlar.

7. A fuel cell according to claim 1, wherein the non-absorbent material of the second layer is in the form of a sheet with a surface having raised features.

8. A fuel cell according to claim 7, wherein the through openings in the second layer are not in direct contact with the first layer.

9. A fuel cell according to claim 1, wherein the air permeable, absorbent first layer comprises a porous material, and is preferably a cloth material.

10. A fuel cell according to claim 1, wherein the air permeable layer comprises a hydrophilic material.

11. A fuel cell according to claim 1, further comprising an air permeable, absorbent layer substantially coincident with a second surface of a polymer electrolyte membrane fuel cell.

12. A fuel cell according to claim 11, wherein the second surface of the polymer electrolyte membrane fuel cell comprises a fuel facing surface.

13. A fuel cell according to claim 11, wherein the second surface of the polymer electrolyte membrane fuel cell comprises a fuel flow plate, a former, an anode or an anode current collector.

14. A method of modifying a polymer electrolyte membrane fuel cell to improve its performance, which method comprises installing a humidification system as specified in claim 1 upon a first surface of the fuel cell.

* * * * *